Jan. 19, 1943.  D. M. BERGES  2,308,583
VALVE
Filed July 22, 1941
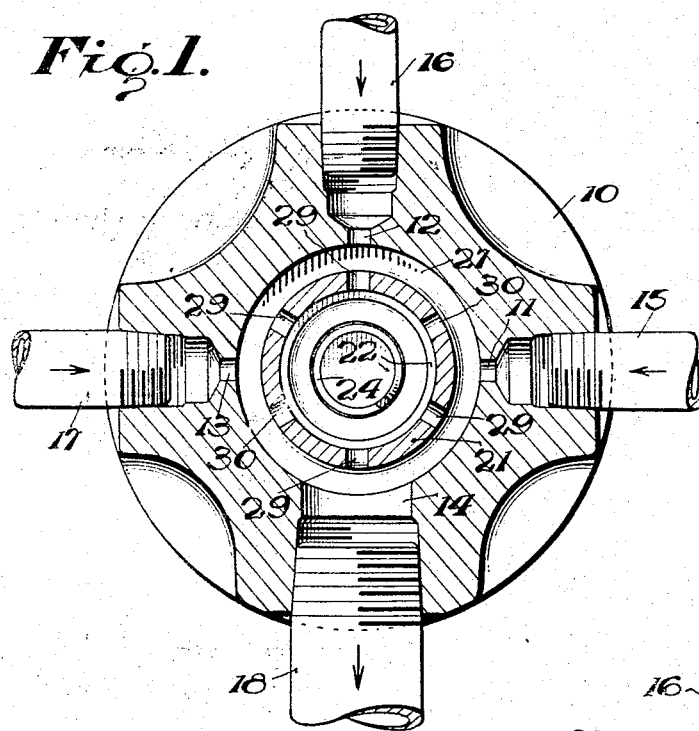
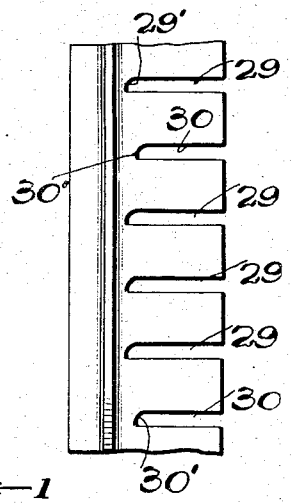
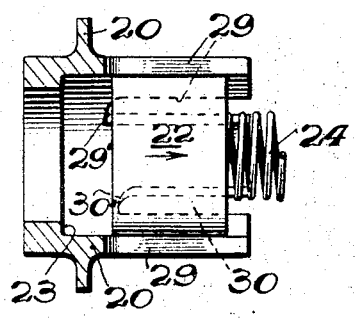
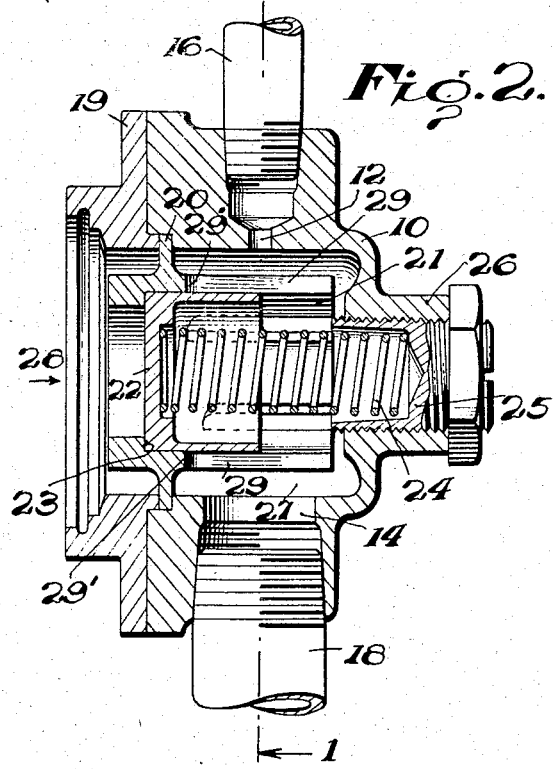
INVENTOR
Donald M. Berges
BY
David F. Brody
ATTORNEY Patented Jan. 19, 1943

2,308,583

UNITED STATES PATENT OFFICE 2,308,583

VALVE

Donald M. Berges, Tenafly, N. J., assignor to Bendix Aviation Corporation, South Bend, Ind., a corporation of Delaware Application July 22, 1941, Serial No. 403,585

1 Claim. (Cl. 137—153)

This invention relates to valve mechanisms, and more particularly to regulating valves for maintaining a constant pressure in a fluid conduit.

It is an object of the present invention to provide a pressure regulating valve in a system subject to pressure changes, in which the valve will act to maintain the pressure constant.

It is a further object of the invention to provide a pressure regulating valve wherein erratic operation, due to valve leakage, is eliminated.

Other objects of the invention include the provision of a regulator valve structure wherein small movements of the valve result in controlled increases in the passage of fluid past the valve, and the provision of a regulator valve, in which there is a plurality of stages of increase of fluid past a valve, with increased opening of the valve.

Other objects will appear from a study of the following specification when made in conjunction with the attached drawing, throughout which like numerals designate like parts.

Fig. 1 is a sectional view of one embodiment of the present invention taken along the line I—I of Fig. 2.

Fig. 2 is a cross-sectional view of the same embodiment of the invention.

Fig. 3 is a plan view showing a detail of valve structure in accordance with the present invention.

Fig. 4 is a detail view in cross-section of the valve and sleeve assembly of the present invention in one position of operation; and Fig. 5 is a similar view showing the valve in a second condition of operation.

It is common to drive certain aircraft navigational instruments by air. For example, the directional gyro, the rate of turn instrument and many others, have their rotors spun in a casing, from which air is exhausted by a vacuum pump, and it is important that the exhaust pressure be maintained as constant as possible, so that the gyro rotors may be spun at constant speeds.

In the prior art, several types of valves have been devised for location in the exhaust conduit from the gyro instruments anterior to the pump, but the systems have suffered from several disadvantages, principal among which are the ill effects of leakage, of hunting in the valve member, and inability of the valve to act quickly enough to prevent an appreciable change of pressure in the air exhausted from the instrument casings and drawn through the vacuum pump.

In the prior art, tappet or ball and spring valves have been customarily used. However, when the pressure in the pump input approached the pressure of the atmosphere, leakage occurred due to the inability of the springs to maintain the valves upon their seats. As a consequence, during certain times when the valves should have been closed, due to their tendency to become unseated, large leakages of air past the valves would occur, and the regulation in the line would become poor. During conditions of leakage, due to Bernouilli effect, increased opening of the valves in response to the demands of the line was made difficult.

Having particular reference to Figs. 1 and 2, there is shown a valve housing 10 having a plurality of input ports 11, 12 and 13, and a single outlet or exhaust port 14, to which are attached, by means of conventional screw threads, the conduits 15, 16, 17 and 18, respectively. Conduits 15, 16 and 17 are connected with the casings (not shown) of individual air-driven instruments, and conduit 18 is connected to the input of a vacuum pump (not shown).

Housing 10 includes a separable end plate 19, which may be affixed thereto by any conventional securing means, and which secures circumfluential flange 20 to sleeve member 21. Housing 10 may be of any suitable material, such as cast aluminum, and sleeve member 21 may be of bronze, steel, etc. Sleeve 21 carries a cup-shaped valve member 22, of stainless steel or the like, in a close, but freely sliding fit. As shown in Figs. 2, 4 and 5, sleeve 21 includes a seat 23 for valve 22, against which valve 22 is urged, by means of a helical spring 24, which has one end carried in a screw threaded cup member 25. The tension of spring 24 is subject to adjustment by the rotation of cup member 25 within the screw threaded neck 26 of housing 10.

Sleeve member 21 is rigidly suspended in a valve chamber 27, which is open to communication between each of the inlet ports 11, 12, 13 and outlet or exhaust port 14. End plate 19 has a central auxiliary inlet port 28, which, in ordinary use, may be covered by a screen or filter member (not shown) for preventing the entrance of grit and other foreign matter to the valve chamber 27.

As shown in Fig. 2, valve member 22 is seated upon valve seat 23, and the pump (not shown) draws air in the direction of the arrows shown in Fig. 1, so that a sub-atmospheric or "suction" pressure exists in chamber 27. Atmospheric or cabin pressure is exerted against valve 22 through inlet port 28, and spring 24 has sufficient tension to prevent the entrance of air through port 28 until the pressure within chamber 27 has dropped below a desired value, and thus, causes a greater differential in pressure between chamber 27 and the atmosphere than normally exists. When pressure in chamber 27 falls below the minimum desirable value, spring 24 has insufficient tension to maintain valve 22 closed, and air is thus admitted through port 28 to raise the pressure in chamber 27.

Fig. 3 shows the development of sleeve member 21. A plurality of longitudinal slots 29, is formed in sleeve 21, and these extend to a predetermined distance from valve seat 23, terminating in curved inner ends 29'. A second set of slots 30, of a length less than the length of slots 29, terminating in curved inner ends 30', also is shown in Fig. 3. When valve 22 is in the position indicated in Fig. 4, air enters chamber 27 through the uncovered portion of each of the slots 29. When valve 22 is in the position shown in Fig. 5, air enters chamber 27, not only through slots 29, but also through the shorter slots 30.

It will be seen that when excessive external pressure against valve 22 tends to move it to the right, there is an interval during which the valve, through unseated, does not allow leakage of air into chamber 27, since neither set of slots 29 or 30 is uncovered, and should the internal pressure of chamber 27 increase, then valve 22 will be reseated without the admission of atmospheric air into chamber 27. Thus, no leakage occurs for small valve movements. However, if valve 22 moves slightly more to the right, as shown in Fig. 4, then slots 29 are uncovered, and admit air sufficient to restore the pressure balance when the drop in pressure in chamber 27 has been small. Due to curved ends 29', the initial admission of air is slight and the pressure in chamber 27 is therefore only slightly changed. However, should the drop in pressure of chamber 27 increase, due, for example, to an increase in pump speed, continued movement of valve 22 to the right uncovers not only additional sections of slots 29, but in the position shown in Fig. 5, slots 30 become gradually uncovered and then give a sudden increase in flow of atmospheric air through port 28 into chamber 27, and act to quickly restore the drop of pressure in chamber 27 below the desired minimum.

By means of the present invention, slight, momentary drops of pressure in chamber 27 are not regulated, nor does leakage occur, since in most cases, slight pressure drops are due to instantaneous and transient pressure conditions that are self-correcting, and if regulation were attempted, then a long hunting cycle would be set up within the regulator. However, when the pressure drop within chamber 27 continues, and when it becomes appreciable, valve 22, in moving to uncover slots 29, affords a large, yet controlled, area through which air may be admitted to chamber 27 to raise the chamber pressure above the minimum requirement, and under the most serious conditions of pressure drop, valve 21 continues to move to the right, uncovering slots 30 to restore the pressure in chamber 27 to its desired minimum.

While only one embodiment of the present invention has been shown in the drawing, it is to be understood that various changes may be made without departing from the scope of the present invention. For this reason, it is intended not to limit the invention by the description herein given as an example, but solely by the scope of the appended claim.

What is claimed is:

A valve device comprising a housing, a valve chamber therein, a valve within said chamber, a sleeve member embracing said valve and having a valve seat formed in one end thereof, a plurality of slots extending longitudinally along said sleeve and terminating an equal distance from said seat, a plurality of additional slots extending longitudinally along said sleeve and terminating at a distance from said seat greater than the first mentioned slots, the distance between said seat and the terminating point of said first mentioned slots being sufficient to permit appreciable movement of said valve prior to its uncovering any of said slots, a plurality of inlet ports and an outlet port formed in said chamber and being in constant communication with said inlet ports, an auxiliary inlet port separable from said chamber by said valve, and a helical spring within said chamber disposed to urge said valve upon said seat, against a definite pressure of a predetermined value, and to permit displacement from said seat and communication between said auxiliary inlet port and said chamber in varying degree, depending upon the pressure acting against said valve from the exterior of said auxiliary inlet port.

DONALD M. BERGES.